US006762869B2

(12) United States Patent
Maleki et al.

(10) Patent No.: US 6,762,869 B2
(45) Date of Patent: Jul. 13, 2004

(54) ATOMIC CLOCK BASED ON AN OPTO-ELECTRONIC OSCILLATOR

(75) Inventors: Luftollah Maleki, Pasadena, CA (US); Nan Yu, Arcadia, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 10/410,873

(22) Filed: Apr. 9, 2003

(65) Prior Publication Data

US 2004/0109217 A1 Jun. 10, 2004

Related U.S. Application Data

(60) Provisional application No. 60/371,055, filed on Apr. 9, 2002.

(51) Int. Cl.[7] .............................. G02F 1/01; G02F 1/03; G01J 5/08; H01S 3/13

(52) U.S. Cl. ........................ 359/239; 359/245; 359/247; 250/227.11; 372/32

(58) Field of Search .................................. 359/239, 245, 359/247, 249, 345, 347, 341; 250/227.11; 372/32

(56) References Cited

U.S. PATENT DOCUMENTS

| | | | | | |
|---|---|---|---|---|---|
| 5,267,072 | A | | 11/1993 | Maleki | |
| 5,340,980 | A | * | 8/1994 | Bianchini et al. | 250/214 R |
| 5,723,856 | A | | 3/1998 | Yao et al. | |
| 5,777,778 | A | | 7/1998 | Yao | |
| 5,917,179 | A | | 6/1999 | Yao | |
| 5,929,430 | A | | 7/1999 | Yao et al. | |
| 6,389,197 | B1 | | 5/2002 | Iltchenko et al. | |
| 6,473,218 | B1 | | 10/2002 | Maleki et al. | |
| 6,490,039 | B2 | | 12/2002 | Maleki et al. | |
| 6,567,436 | B1 | | 5/2003 | Yao et al. | |
| 6,654,394 | B1 | * | 11/2003 | Sellin et al. | 372/32 |

* cited by examiner

*Primary Examiner*—Tim Thompson
(74) *Attorney, Agent, or Firm*—Fish & Richardson P.C.

(57) ABSTRACT

Opto-electronic oscillators having a frequency locking mechanism to stabilize the oscillation frequency of the oscillators to an atomic frequency reference. Whispering gallery mode optical resonators may be used in such oscillators to form compact atomic clocks.

38 Claims, 12 Drawing Sheets

ATOMIC CLOCK BASED ON AN OPTO-ELECTRONIC OSCILLATOR

This application claims the benefit of U.S. Provisional Application No. 60/371,055 filed on Apr. 9, 2002, the entire disclosure of which is incorporated herein by reference as part of this application.

ORIGIN OF THE INVENTION

The systems and techniques described herein were made in the performance of work under a NASA contract, and are subject to the provisions of Public Law 96-517 (35 USC 202) in which the Contractor has elected to retain title.

BACKGROUND

This application relates to opto-electronic oscillators and their applications.

An oscillating electrical signal may be used to carry information in either digital or analog form. The information can be imbedded in the electrical signal by a proper modulation, such as the amplitude modulation, the phase modulation, and other modulation techniques. The information in the electrical signal may be created in various ways, e.g., by artificially modulating the electrical carrier, or by exposing the electrical carrier to a medium which interacts with the carrier. Such signals may be transmitted via space or conductive cables or wires.

It is well known that an optical wave may also be used as a carrier to carry information in either digital or analog form by optical modulation. Such optical modulation may be achieved by, e.g., using a suitable optical modulator, to modulate either or both of the phase and amplitude of the optical carrier wave. Signal transmission and processing in optical domain may have advantages over the electrical counterpart in certain aspects such as immunity to electromagnetic interference, high signal bandwidth per carrier, and easy parallel transmission by optical wavelength-division multiplexing (WDM) techniques.

Certain devices and systems may be designed to have electrical-optical "hybrid" configurations where both optical and electrical signals are used to explore their respective performance advantages, conveniences, or practical features. Notably, opto-electronic oscillators ("OEOs")are formed by using both electronic and optical components to generate oscillating signals in a range of frequencies, e.g., from the microwave spectral ranges to the radio-frequency ("RF") spectral range. See, e.g., U.S. Pat. Nos. 5,723,856, 5,777,778, 5,929,430, and 5,917,179 for some examples of OEOs.

Such an OEO typically includes an electrically controllable optical modulator and at least one active opto-electronic feedback loop that comprises an optical part and an electrical part interconnected by an optical-to-electrical conversion element such as a photodetector. The opto-electronic feedback loop receives the modulated optical output from the modulator and converted it into an electrical signal to control the modulator. The loop produces a desired delay and feeds the electrical signal in phase to the modulator to generate and sustain both optical modulation and electrical oscillation when the total loop gain of the active opto-electronic loop and any other additional feedback loops exceeds the total loss. The generated oscillating signals can be tunable in frequency and have narrow spectral linewidths and low phase noise in comparison with the signals produced by other RF and microwaves oscillators. OEOs can be particularly advantageous over other oscillators in the high RF spectral ranges, e.g., frequency bands on the order of GHz and tens of GHz.

SUMMARY

Techniques and devices of this application are in part based on the recognition that the long-term stability and accuracy of the oscillating frequency of an OEO may be desirable in various applications. Accordingly, this application discloses, among other features, mechanisms for stabilizing the oscillating frequency of an OEO with respect to or at a reliable frequency reference to provide a highly stable signal. In addition, the absolute value of the oscillating frequency of the OEO can be determined with high accuracy or precision. The reliable frequency reference may be, for example, a reference frequency defined by two energy levels in an atom. Thus, such an OEO can be coupled to and stabilized to the atomic reference frequency to operate as an atomic clock.

In one exemplary implementation, a device according to this application may include an opto-electronic oscillator and an atomic reference module that are coupled to each other. The opto-electronic oscillator may include an opto-electronic loop with an optical section and an electrical section and operable to generate an oscillation at an oscillation frequency. The atomic reference module may be coupled to receive and interact with at least a portion of an optical signal in the optical section to produce a feedback signal. The opto-electronic oscillator is operable to respond to this feedback signal to stabilize the oscillation frequency with respect to an atomic frequency reference in the atomic reference module.

In another exemplary implementation, a device according to this application may include an optical modulator, an opto-electronic loop, a frequency reference module, and a feedback module. The optical modulator is operable to modulate an optical carrier signal at a modulation frequency in response to an electrical modulation signal to produce modulation bands in the optical carrier signal. The opto-electronic loop has an optical section coupled to receive a first portion of the optical carrier signal, and an electrical section to produce the electrical modulation signal according to the first portion of the optical carrier signal. The opto-electronic loop causes a delay in the electrical modulation signal to provide a positive feedback to the optical modulator. The frequency reference module has an atomic transition in resonance with a selected modulation band among the modulation bands and is coupled to receive a second portion of the optical carrier signal. The second portion interacts with the atomic transition to produce an optical monitor signal. The feedback module is operable to receive the optical monitor signal and to control the optical modulator in response to information in the optical monitor signal to lock the modulation frequency relative to the atomic transition.

This application also discloses various methods for operating or controlling opto-electronic oscillators. In one method, for example, a coherent laser beam is modulated at a modulation frequency to produce a modulated optical beam. Next, a portion of the modulated optical beam is transmitted through an optical delay element to cause a delay. The portion of the optical signal from the optical delay element is converted into an electrical signal. This electrical signal is then used to control the modulation of the coherent laser beam to cause an oscillation at the modulation frequency. A deviation of the modulation frequency from an atomic frequency reference is then obtained. The modulation of the coherent laser beam is then adjusted to reduce the deviation.

These and other implementations of the devices and techniques of this application are now described in greater details as follows.

DETAILED DESCRIPTION

Figure 1:
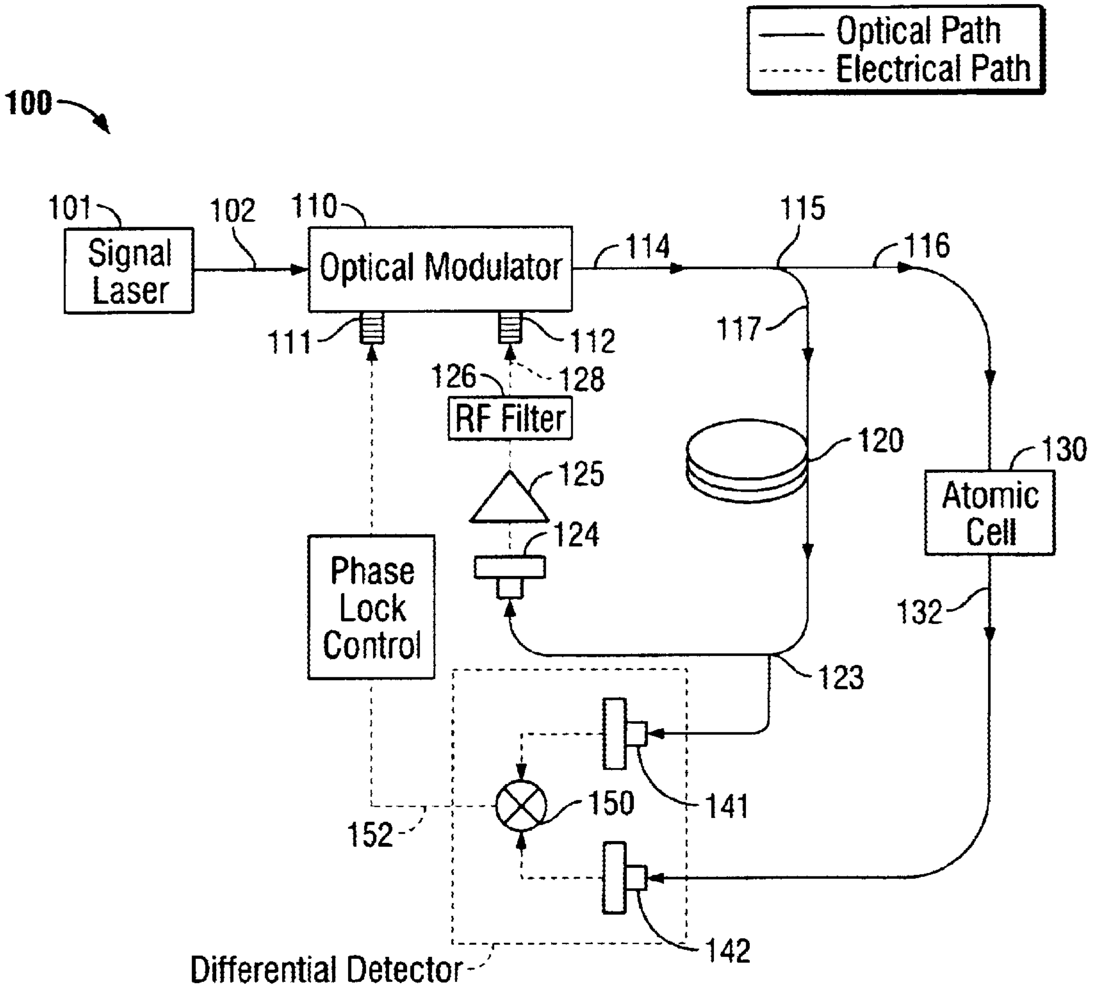
FIG. 1 shows one implementation of an opto-electronic oscillator atomic clock based on a phase lock loop to lock the OEO to an atomic frequency reference.

FIG. 1 shows one implementation of a device 100 that has an OEO and a control mechanism to lock the oscillation frequency of the OEO to an atomic transition. In the illustrated example, the OEO receives an optical beam 102 at a carrier frequency ($\nu_o$) produced by a laser 101 and uses an electrically controllable optical modulator 110 to modulate the laser beam 102 at a modulation frequency ($\nu_{mod}$). The optical modulator 110 may operate in response to an electrical modulation signal 128 applied to its port 112 and may also be configured to receive a DC bias signal 152 at its port 111. The bias can shift the operating point of the modulator 110 to change the modulation frequency. The operation of the modulator 110 produces a modulated optical signal 114 which includes multiple spectral components caused by the modulation.

Figure 2A:
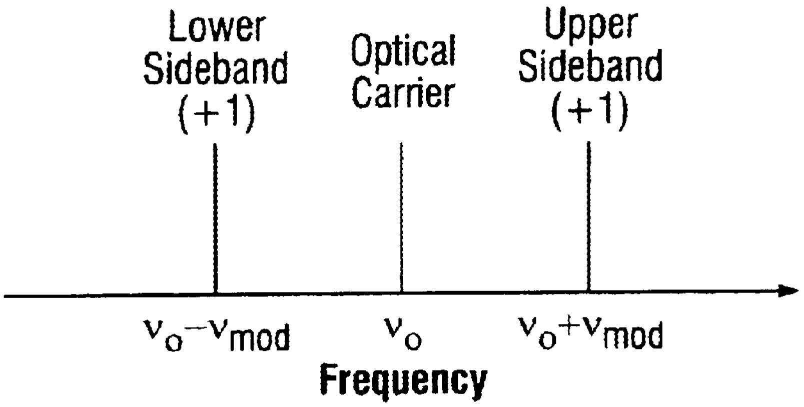
FIGS. 2A and 2B illustrate exemplary spectral components in modulated optical signals.
Figure 2B:
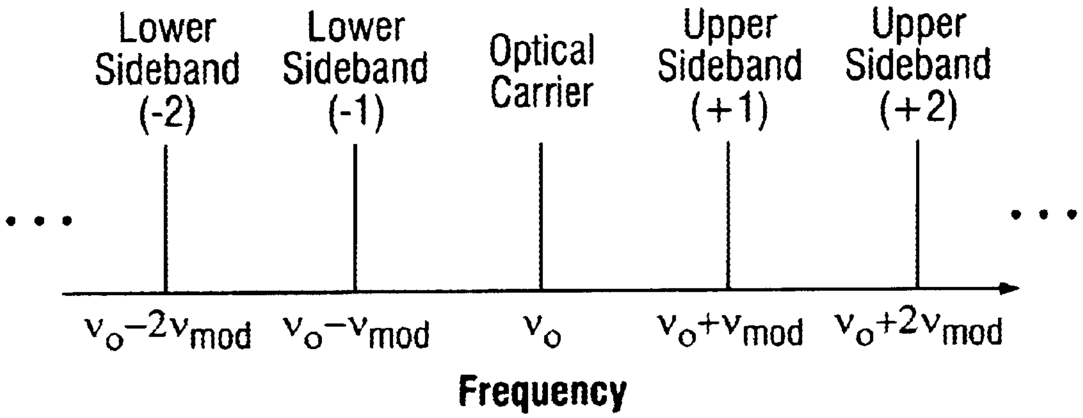

The optical modulator 110 may be an amplitude modulator which periodically changes the amplitude of the optical signal, or a phase modulator which periodically changes the phase of the optical signal. Referring to FIG. 2A, the amplitude modulation produces an upper modulation sideband (+1) and a lower modulation sideband (−1), both shifted from the carrier frequency ($\nu_o$) by the same amount, i.e., the modulation frequency ($\nu_{mod}$). In the phase modulation, however, more then two sidebands are present in the modulated signal 114. FIG. 2B illustrates the spectral components of a phase-modulated signal 114. Two immediate adjacent bands are separated by the modulation frequency ($\nu_{mod}$).

Referring back to FIG. 1, the OEO may include at least one active opto-electronic feedback loop that comprises an optical part and an electrical part interconnected by an optical-to-electrical conversion element such as a photodetector 124. An optical splitter 115 may be used to split the modulated signal 114 into a signal 117 for the opto-electronic feedback loop and a signal 116 for a frequency reference module that provides the atomic transitions for stabilizing the OEO. The splitter 115 may also be used to produce an optical output of the device 100.

The optical section of the opto-electronic feedback loop is used to produce a signal delay in the modulation signal 128 by having an optical delay element 120, such as a fiber loop or an optical resonator. The total delay in the opto-electronic feedback loop determines the mode spacing in the oscillation modes in the OEO. In addition, a long delay reduces the linewidth of the OEO modes and the phase noise. Hence, it is desirable to achieve a long optical delay. When an optical resonator is used as the delay element 120, the high Q factor of the optical resonator provides a long energy storage time to produce an oscillation of a narrow linewidth and low phase noise. Different from other optical delay elements, the resonator as a delay element requires mode matching conditions. First, the laser carrier frequency of the laser 101 should be within the transmission peak of the resonator to provide sufficient gain. In this application, the resonator may be actively controlled to adjust its length to maintain this condition since the laser 101 is stabilized. Second, the mode spacing of the optical resonator is equal to one mode spacing, or a multiplicity of the mode spacing, of the opto-electronic feedback loop. In addition, the oscillating frequency of the OEO is equal to one mode spacing or a multiple of the mode spacing of the optical resonator.

The optical resonator for the delay element 120 may be implemented in a number of configurations, including, e.g., a Fabry-Perot resonator, a fiber ring resonator, a micro resonator that includes a portion of the equator of a sphere to whispering-gallery modes (such as a disk or a ring cavity) and a non-spherical cavity that is axially symmetric. The non-spherical resonator may be formed by distorting a sphere to a non-spherical geometry to purposely achieve a large eccentricity, such as an oblate spheroidal microcavity or microtorus formed by revolving an ellipse around a symmetric axis along the short elliptical axis. The optical coupling for a whisper gallery mode cavity can be achieved by evanescent coupling. A tapered fiber tip, a micro prism, an coupler formed from a photonic bandgap material, or other suitable optical couplers may be used.

The electrical section of the opto-electronic loop may include an amplifier 125, and an electrical bandpass filter 126 to select a single OEO mode to oscillate. A signal coupler may be added in the electrical section to produce an electrical output. The output of the photodetector 124 is processed by this electrical section to produce the desired modulation signal 128 to the optical modulator 110. In particular, the loop produces a desired delay and feeds the electrical signal in phase to the modulator to generate and sustain both optical modulation and electrical oscillation when the total loop gain of the active opto-electronic loop exceeds the total loss. Two or more feedback opto-electronic loops with different loop delays may be implemented to provide additional tuning capability and flexibility in the OEO.

Notably, the device 100 implements a frequency reference module to form a phase lock loop to dynamically stabilize the OEO oscillation frequency to an atomic transition. Similar to the opto-electronic feedback loop, this module also operates based on a feedback control. However, different from the opto-electronic feedback loop, this feedback loop is a phase lock loop and is designed to avoid any oscillation and operates to correct the frequency drift or jitter of the oscillating OEO mode with respect to an atomic transition.

The frequency reference module in the device 100 includes an atomic cell 130 containing atoms with desired atomic transitions. The optical signal 116 is sent into the cell 130 and the optical transmission 132 is used as an optical monitor signal for monitoring the frequency change in the OEO loop. The cell 130 operates in part as an atomic optical filter because it is a narrow bandpass filter to transmit optical energy in resonance with an atomic transition. The cell 130 also operates as a frequency reference because the optical monitor signal 132 includes information about the deviation of the OEO oscillating frequency from a desired oscillating frequency based on a frequency corresponding to a fixed separation between two energy levels in the atoms. Under the configuration in FIG. 1 where the atomic cell 130 is outside the OEO loop, this information in the optical monitor signal 132 needs to be retrieved by a differentiation method as described below.

In addition to the cell 130, the frequency reference module further includes a differential detector that compares the optical signal in the optical section of the OEO loop and the optical monitor signal 132 to obtain the frequency deviation in the OEO oscillating frequency. This differential detector includes two optical detectors 141 and 142 and an electrical element 150 that subtracts the two detector outputs. The element 150 may be, e.g., a signal mixer or a differential amplifier. An optical splitter 123 may be placed in the optical section of the OEO loop to split a portion of the modulated optical signal into the detector 141. The difference of the signals from the detectors 141 and 142 is the differential signal 152 which is used to control the DC bias of the optical modulator 110. A phase lock loop circuit may be implemented to perform the actual control over the DC bias in response to the signal 152.

Figure 5:
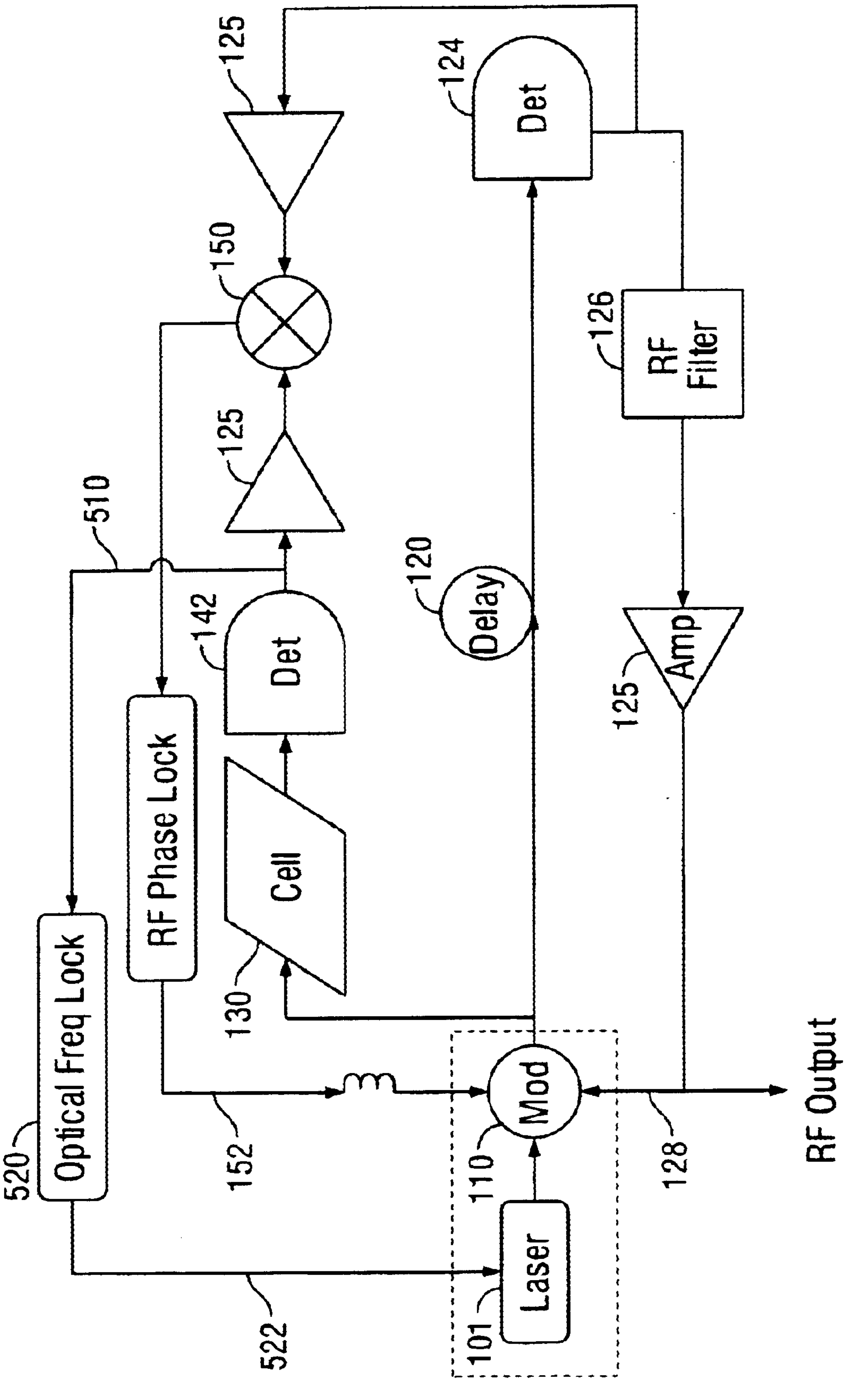
FIGS. 5 and 6 show two OEO-based atomic clocks with a laser stabilization module based on the same atomic frequency reference.

As an alternative implementation for the differential detector, the optical splitter 123 and the optical detector 141 may be eliminated. Instead, a portion of the output from the detector 124 may be split off and amplified if needed to feed into the element 150 as one of the two input signals for generating the signal 152. An example of such implementation is shown in FIG. 5.

Figure 3:
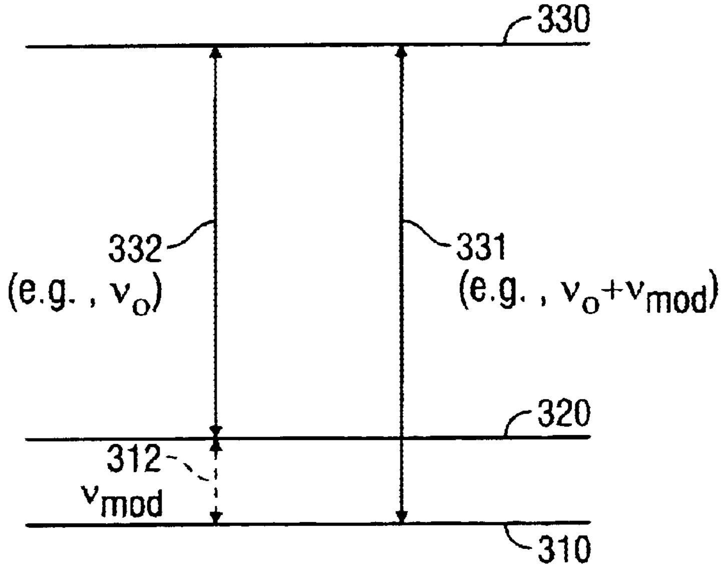
FIG. 3 shows one exemplary 3-level atomic energy structure for the atoms in the atomic clock to provide the atomic frequency reference.

The atoms in the atomic cell 130 are selected to have three energy levels capable of producing a quantum interference effect, "electromagnetically induced transparency." FIG. 3 illustrates one example of the three energy levels 310, 320, and 330 in a suitable atom. The energy levels 310 and 320 are two lower energy levels such as ground state hyperfine levels and the energy level 330 is a higher excited state level common to and shared by both levels 310 and 320. Optical transitions 331 and 332 are permissible via dipole transitions from both ground states 310 and 320 to the excited state 330, respectively. No optical transition, however, is permitted between the two ground states 310 and 320. It is also assumed that the non-radiative relaxation rate between the two lower states 310 and 320 is small and is practically negligible in comparison with the decay rates from the excited state 330 to the ground states 310 and 320. The difference in frequency between the two optical transitions 331 and 332 corresponds to a desired modulation frequency ($\nu_{mod}$) in the electrical domain, e.g., the RF, microwave, or millimeter spectral range. In the exemplary atomic structure in FIG. 3, this desired modulation frequency is the gap 312 between the two lower states 310 and 320. Examples for such atoms include the alkali atoms, such as cesium with a gap of about 9.2 GHz between two hyperfine ground states and rubidium with a gap of about 6.8 GHz between two hyperfine ground states. Different atoms with different energy level structures may be selected for different OEOs to operate at different modulation frequencies.

In this atom in FIG. 3, an electron in the ground state 310 can absorb a photon in resonance with the transition 331 to become excited from the ground state 310 to the excited state 330. Similarly, an electron in the ground state 320 can be excited to the excited state 330 by absorbing a photon in resonance with the transition 332. Once excited to the excited state 330, an electron can decay to either of the ground states 310 and 320 by emitting a photon. If only one optical field is present and is in resonance with either of the two optical transitions, e.g., the transition 331, all electrons will be eventually transferred from one ground state 310 in the optical transition 331 to the other ground state 320 not in the optical transition 331. Hence, the atomic cell 130 will become transparent to the beam in resonance with the transition 331.

If a second optical field is simultaneously applied to the transition 332 and is coherent with the first optical field, the two ground states 310 and 320 are no longer isolated from each other. In fact, under the Raman resonance condition when the two applied optical fields are exactly in resonance with the two optical transitions 331 and 332, a quantum-mechanical coherent population trapping occurs in which the two ground states 310 and 320 are quantum-mechanically interfered with each other to form an out-of-phase superposition state and become decoupled from the common excited state 330. Under this condition, there are no permissible dipole moments between the superposition state and the excited state 330 and hence no electron in either of the two ground states 310 and 320 can be optically excited to the excited state 330. As a result, the atomic cell 130 becomes transparent to both optical fields that are respectively in resonance with the transitions 331 and 332. When either of the two applied optical fields is tuned away from its corresponding resonance, the atoms in the ground states 310 and 320 become optically absorbing again.

This electromagnetically induced transparency has a very narrow transmission spectral peak with respect to the frequency detuning of either of the two simultaneously-applied optical fields. The narrow transmission peak is present in the optical monitor signal 132 that transmits through the cell 130. In one implementation, the above differential detection with the differential detector uses the optical signal in the opto-electronic loop as a reference to determine the direction and the amount of the deviation of the optical frequencies of the two optical fields. Assuming the laser 101 is stabilized at a proper carrier frequency ($\nu_o$) to cause the double resonance condition for the electromagnetically induced transparency, any deviation from the resonance condition should be caused by the shift or fluctuation in the OEO loop. To correct this deviation indicated by the differential detector, the DC bias of the optical modulator 110 is adjusted accordingly to correct the deviation in real time. This feedback operation locks the oscillating frequency of the OEO at the frequency separation 312 between the two optical transitions 331 and 332 which is the energy separation between the two ground states 310 and 320 in this particular energy structure shown in FIG. 3. In this context, the device 100 operates as an atomic clock.

Referring to FIG. 2A, if the optical modulator 110 modulated the amplitude, the laser 101 may be tuned to a resonance with either the transition 331 or the transition 332 while the lower or the upper sideband is in resonance with the other transition. Although any two immediate adjacent bands in the modulated optical signal 114 may be used, it is usually practical to use the carrier band and another strong sideband.

Atoms with other atomic energy structures may also be used for the atomic cell 130. The 3-level energy structure in FIG. 3 where two lower states share one common excited state is referred to as the λ configuration. Alternatively, atoms with two excited states sharing a common ground state in a V configuration may also be used. Furthermore, a consecutive three energy levels in a ladder configuration may also be used, where the middle energy level is the excited state in a first optical transition with the lowest energy level as the corresponding lower state and is also the lower state for a second optical transition with the highest level as the corresponding excited state. Atoms in the cell 130 may be in the vapor phase, or may be embedded in a suitable solid-state material which provides a matrix to physically hold the atoms so that a sufficiently narrow atomic transition can be obtained. In a representative implementation for using the vapor-phase atomic cell 130, the atoms are sealed in the cell 130 in vacuum under an elevated temperature to obtain a sufficient atomic density in the cell.

Figure 4:
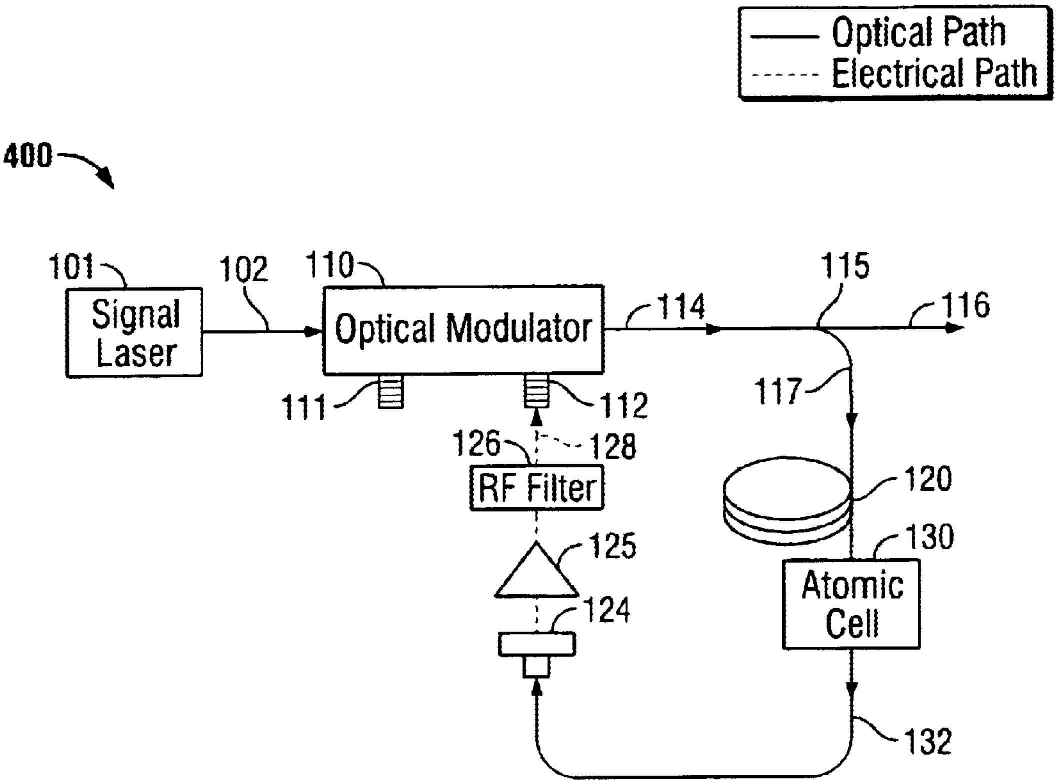
FIG. 4 shows one example of a self-oscillating OEO-based atomic clock.

FIG. 4 shows another implementation where the atomic cell 130 is inserted in the optical section of the loop in an OEO 400 to as a narrow-band optical filter. The operation principle of this design is similar to that of the device 100 in FIG. 1 except that the differential detection and its feedback loop are eliminated. The atomic cell 130 in the OEO loop now operates to directly filter the optical signal to transmits only the optical signal that satisfies the double-resonance Ramen condition. Any other optical signals are rejected by the atomic cell 130. Hence, assuming the laser carrier frequency is fixed, the OEO loop can only provide a sufficient loop gain to amplify and sustain the signal at an oscillating frequency equal to the frequency difference of the two optical transitions for the electromagnetically induced transparency.

Therefore, in FIG. 4, the frequency locking to the atomic frequency reference is built into the OEO loop without external differential detection implemented in FIG. 1. In this context, the OEO in FIG. 4 is a self-oscillating atomic clock. This design greatly simplifies the device structure and can achieve the same stabilized operation as the device 100 in FIG. 1 if the oscillating frequency of the OEO fluctuates or drifts within a small range in which the optical transmission of the cell 130 is sufficient to maintain the overall loop gain to be greater than the loop loss. When the frequency variation of the OEO is greater than the spectral range in the transmission of the atomic cell 130 that can sustain the oscillation, the OEO needs to be adjusted to re-establish the oscillation and the automatic frequency locking to the atomic reference. In comparison, the device 100 in FIG. 1 can automatically correct such a large variation in frequency by virtue of having the phase lock loop based on the differential detection that is external to the OEO loop.

Figure 6:
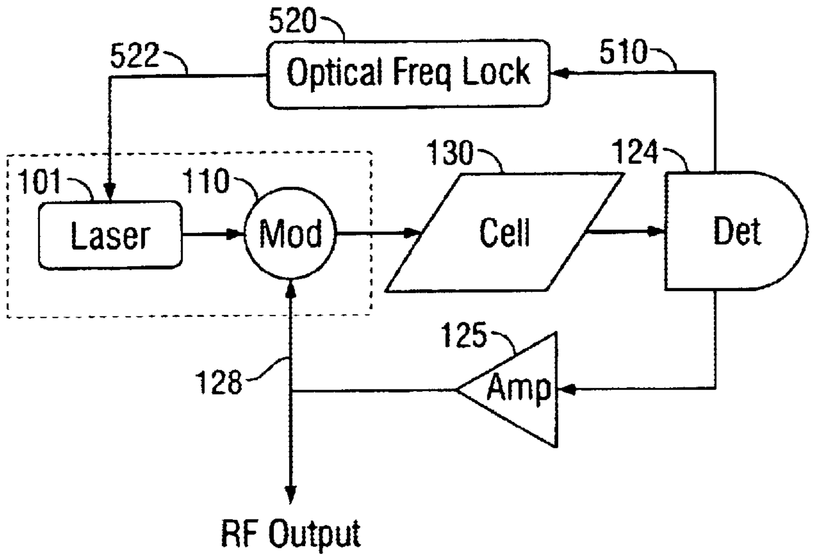

In the above devices, it is assumed that the laser 101 is stabilized at a desired laser carrier frequency ($\nu_o$). When the frequency of the laser 101 changes, the double-resonance Raman condition for the electromagnetically induced transparency in the OEOs may be destroyed and the locking to the atomic frequency reference in the above OEOs may also fail accordingly. Another aspect of this application is to provide a dynamic laser stabilization mechanism that uses the same atomic frequency reference to lock the laser 101 which is tunable in its laser frequency by adjusting one or more laser parameters. FIGS. 5 and 6 illustrate two implementations for OEOs based on the designs in FIGS. 1 and 4, respectively.

The OEO in FIG. 5 uses an electrical signal splitter at the output of the photodetector 142 to produce a signal 510. An optical frequency lock unit 520 receives and processes this signal 510 to produce an error signal that represents the deviation of the laser carrier frequency from a desired carrier frequency. A feedback control signal 522 is generated based on the error signal by the unit 520 to adjust the laser frequency of the laser 101. The adjustment to the laser 101 may be made in various ways to tune its laser frequency depending on the specific laser configuration. For a simple diode laser, for example, the driving current, the diode temperature, or both may be adjusted in response to the control signal 522 to tune the laser frequency.

The laser locking mechanism in FIG. 6 is similar except that the feedback signal 510 is split from the output of the detector 124 in the OEO loop. It is also contemplated that other suitable laser stabilization methods may also be used to control the laser 101. For example, a laser control may use a frequency reference independent from the atomic frequency reference provided by the atoms in the atomic cell 130.

The optical modulator 110 in OEOs in FIGS. 1 and 4–6 may be implemented in various configurations. The widely-used Mach-Zehnder modulators using electro-optical materials can certainly be used as the modulator 110. Such conventional modulators generally are bulky and are not power efficient. The following sections of this application describe some examples of compact or miniature OEOs that use micro cavities that support whispering gallery modes ("WGMs")to provide energy-efficient and compact atomic clocks suitable for various applications, including cellular communication systems, spacecraft communications and navigation, and GPS receivers.

Figure 7:
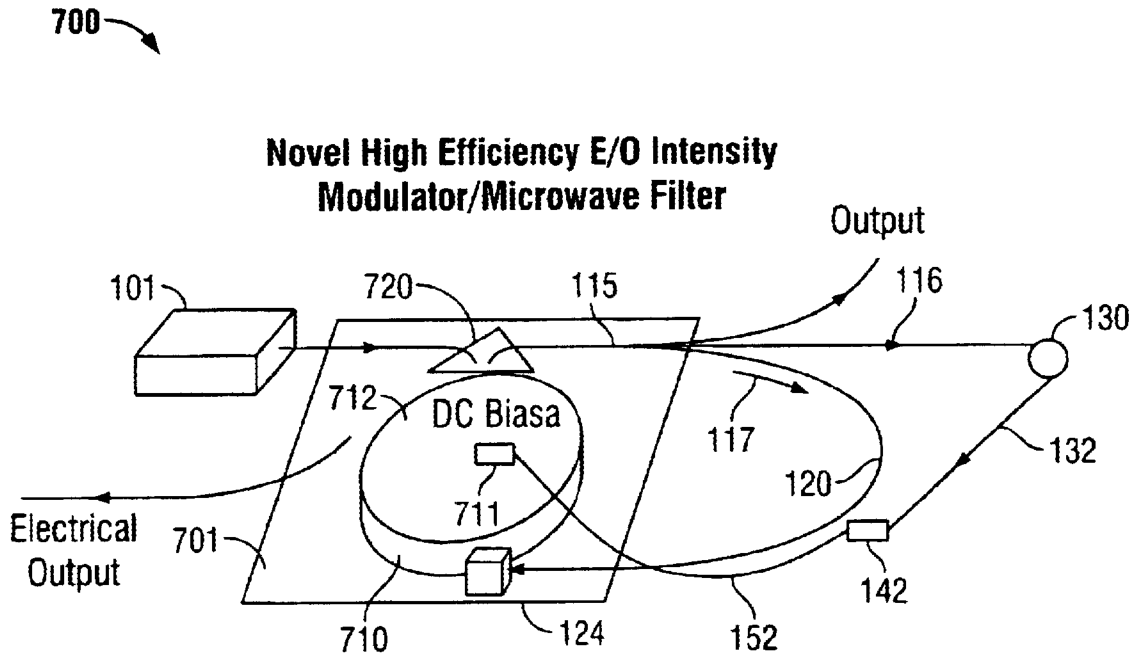
FIGS. 7, 8A, 8B, 9, 10, 11, 12, 13A, and 13B show various whispering-gallery-mode micro cavities and designs for compact OEO-based atomic clocks.

FIG. 7 shows one exemplary OEO 700 that uses a micro WGM cavity 710 formed of an electro-optical material as both an intensity optical modulator and an electrical filter in the OEO loop. In addition, the WGM cavity 710 is further used as an optical delay element in the OEO loop due to its large quality factor Q so that a simple optical loop 120 may be used to provide an optical feedback without a separate optical delay element. As illustrated, a substrate 701 is provided to support the micro cavity 710 and other components of the OEO 700. The laser 101 may be either integrated on the substrate 701 or separated from the rest of the OEO as illustrated. The geometry of the cavity 710 is designed to support one or more WG modes and may be a micro sphere, a cavity formed of a partial sphere that includes the equator such as a disk and a ring, or a non-spherical microcavity.

An electrical control 712 is formed on the cavity 710 to apply the control electrical field in the region where the WG modes are present to modulate the index of the electro-optical material to modulate the amplitude of the light. The electrical control 712 generally may include two or more electrodes on the cavity 710. In one implementation, such electrodes form an RF or microwave resonator to apply the RF or microwave signal to co-propagate along with the desired optical WG mode to modulate the light. Such an RF or microwave resonator by itself also operates as an electrical signal filter to filter the electrical signal in the OEO loop. Hence, there would be no need for a separate filter 126 as shown in FIG. 1. A DC bias electrode 711 may also be formed on the cavity 710 to control the DC bias of the modulator.

The OEO 700 includes an optical coupler 720 to evanescently couple input light from the laser 101 into the cavity 710 and also to extract light out of the WG mode from the cavity to produce the optical output, the optical feedback to the OEO loop and the optical monitor signal to the atomic cell 130. A micro prism is shown as an example of such an evanescent coupler. Certainly, two evanescent couplers may be used: one for the input and another for the output. An optical splitter 115 is used to split the modulated optical signal output by the cavity 710 to both the optical loop 120 such as a fiber loop and the atomic cell 130. In addition the splitter 115 may also produce an optical output for the OEO.

Similar to the some other OEOs described above, a photodetector 124 is connected to the optical delay 120 to convert the optical signal 117 into an electrical detector signal and sends the detector signal, after amplification if needed, to the electrical control 712 for controlling the optical modulation in the cavity 710. The photodetector 142 converts the optical monitor signal 132 transmitted through the cell 130 into the signal 152 which is used to control the DC bias of the optical modulation. A laser stabilization mechanism, either based on or independent from the atomic cell 130 may be included to stabilize the laser 101.

The above optical modulation in the WG cavity 710 is based on the concept that the optical resonance condition of an optical resonator can be controlled to modulate light in the resonator. An optical wave in a supported resonator mode circulates in the resonator. When the recirculating optical wave has a phase delay of N2π (N=1, 2, 3, . . . ), the optical resonator operates in resonance and optical energy accumulates inside the resonator with a minimum loss. If the optical energy is coupled out of the resonator under this resonance condition, the output of the resonator is maximized. However, when the recirculating wave in the resonator has a phase delay other then N2π, the amount of optical energy accumulated in the resonator is reduced and so is the coupled output. If the phase delay in the optical cavity can be modulated, a modulation on the output from an optical resonator can be achieved. The modulation on the phase delay of recirculating wave in the cavity is equivalent to a shift between a phase delay value for a resonance condition and another different value for a non-resonance condition. In implementation, the initial value of phase delay (i.e. detuning from resonance) may be biased at a value where a change in the phase delay produces the maximum change in the output energy.

Figure 8A:
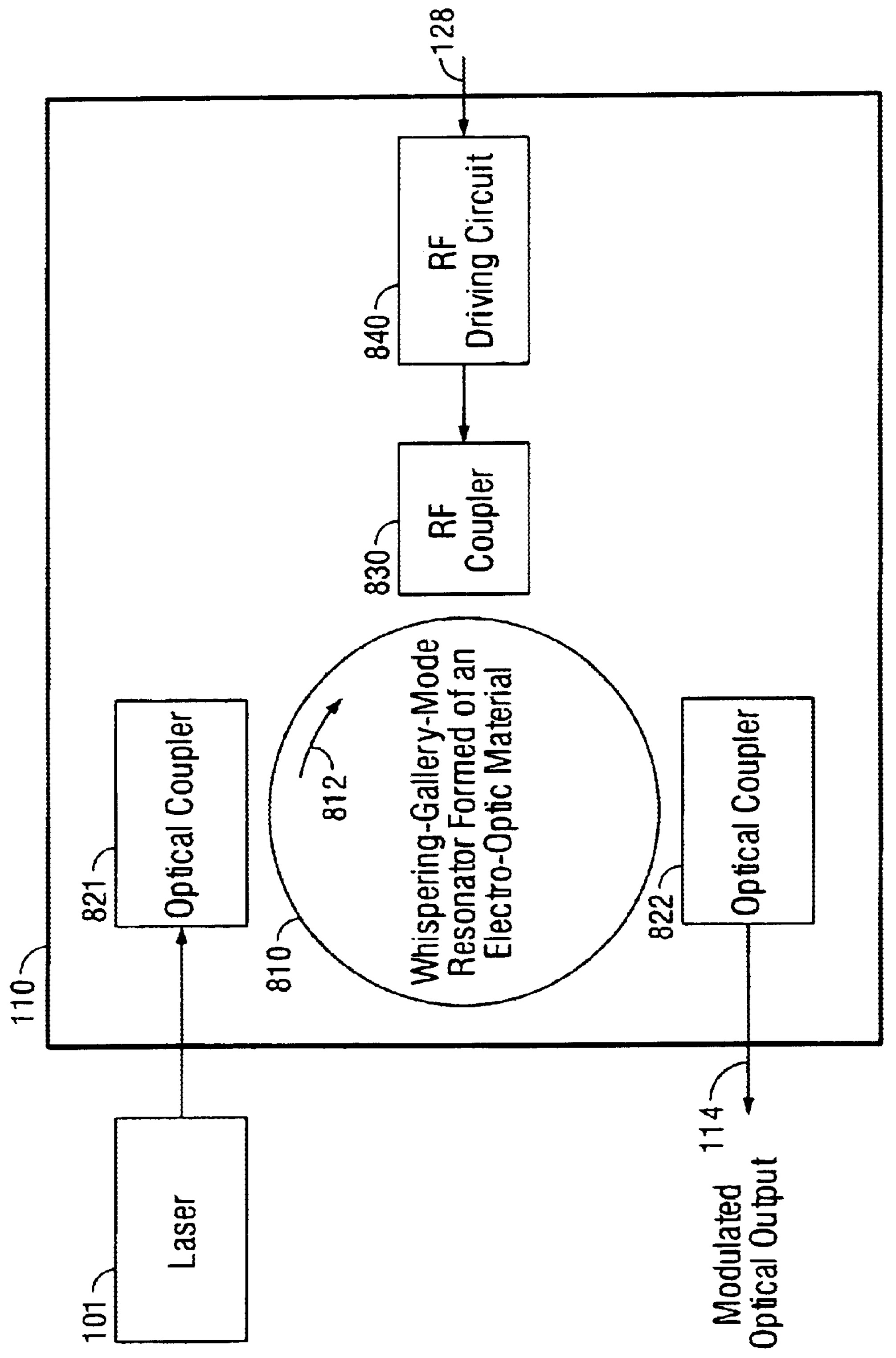

FIG. 8A shows a general design of this type of optical modulators based on a WGM cavity 810 formed from any electro-optic material such as lithium niobate. The phase delay of the optical feedback (i.e. positions of optical cavity resonances) is changed by changing the refractive index of the resonator via electro-optic modulation. An external electrical signal is used to modulate the optical phase in the resonator to shift the whispering-gallery mode condition and hence the output coupling. Such an optical modulator can operate at a low operating voltage, in the millivolt range, and may be used to achieve a high modulation speed at tens of gigahertz or higher, all in a compact package. As illustrated, two optical couplers 821 and 822 are placed close to the resonator 810 as optical input coupler and output coupler, respectively. An input optical beam from the laser 101 is coupled into the resonator 810 as the internally-circulating optical wave 812 in the whispering gallery modes by the coupler 821. In evanescent coupling, the evanescent fields at the surface of the sphere decays exponentially outside the sphere. Once coupled into the resonator, the light undergoes total internal reflections at the surface of the cavity. The effective optical path length is increased by such circulation. The output coupler 822 couples a portion of the circulating optical energy in the resonator 810, also through the evanescent coupling, to produce an output beam 114. Alternatively, the optical coupler 821 may also be used to produce the output 114 as shown in FIG. 7.

An electrical coupler 830 is placed near the resonator 810 to couple an electrical wave which causes a change in the dielectric constant due to the electro-optic effect. An electronic driving circuit 840 is implemented to supply the electrical wave to the electrical coupler 830. A control signal 128 from the detector 124 in the OEO loop can be fed into the circuit 840 to modulate the electrical wave. This modulation is then transferred to a modulation in the optical output 114 of the resonator 810.

The resonator 810 with a high Q factor has a number of advantages. For example, the repetitive circulation of the optical signal in the WG mode increases the effective interaction length for the electro-optic modulation. The resonator 810 can also effectuate an increase in the energy storage time for either the optical energy or the electrical energy and hence reduce the spectral linewidth and the phase noise. Also, the mode matching conditions make the optical modulator operate as a signal filter so that only certain input optical beam can be coupled through the resonator 810 to produce a modulated output by rejecting other signals that fail the mode matching conditions.

Figure 8B:
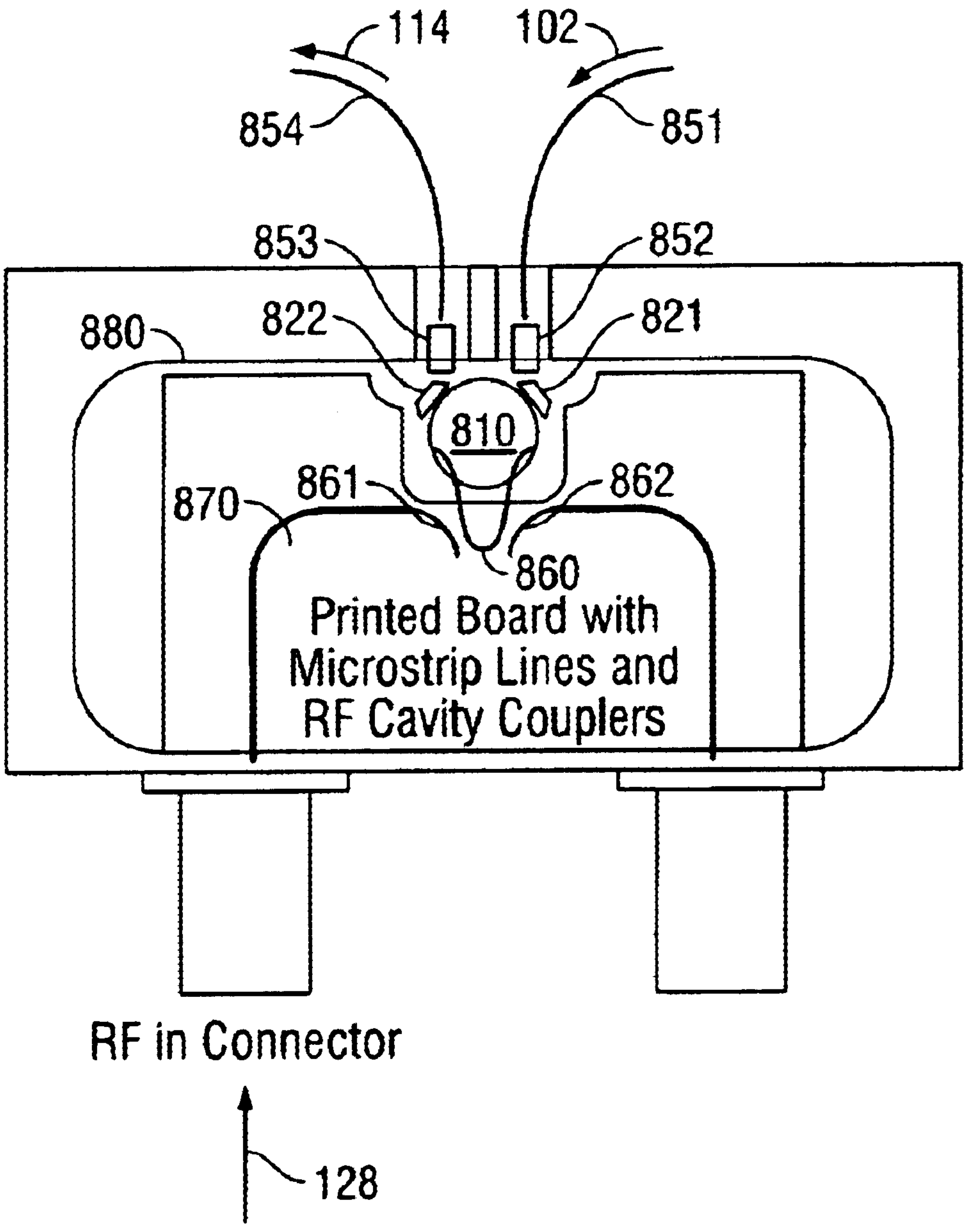

FIG. 8B shows another light modulator in a modulator housing 880 based on the design in FIG. 8A. Optical fibers 851 and 854 are used to guide input and output optical beams 102, 114, respectively. Microlenses 852 and 853, such as gradient index lenses, are used to couple optical beams in and out of the fibers. Two prisms 821 and 822 operate as the evanescent optical couplers to provide evanescent coupling with the whispering gallery mode resonator 810. Instead of using the resonator 810 alone to support the electrical modes, a RF microstrip line electrode 860 is combined with the resonator 810 to form a RF resonator to support the electrical modes. An input RF coupler 861 formed from a microstrip line is implemented to input the electrical energy into the RF resonator. A circuit board 870 is used to support the microstrip lines and other RF circuit elements for the modulator. This modulator also includes a second RF coupler 862, which may be formed from a microstrip line on the board 870, to produce a RF output. This signal can be used as a monitor for the operation of the modulator or as an electrical output for further processing or driving other components.

Figure 9:
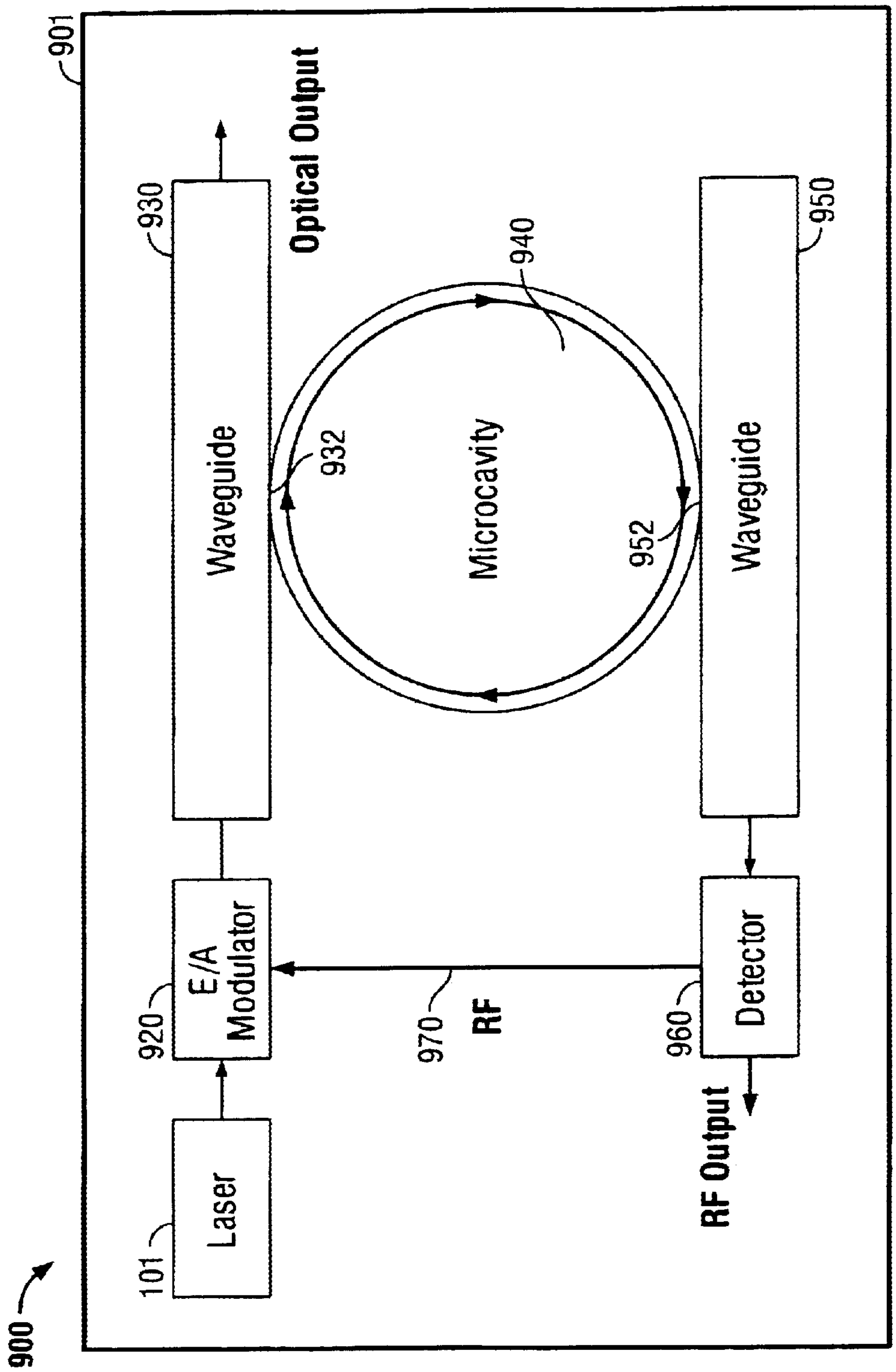

FIG. 9 illustrates an exemplary integrated OEO 900 with all its components fabricated on a semiconductor substrate 901. A micro WGM cavity 940 is used as an optical delay element equivalent to the delay 120 in FIG. 1. The integrated OEO 900 also includes a semiconductor laser 101, a semiconductor electro-absorption modulator 920, a first waveguide 930, a second waveguide 950, and a photodetector 960. In this integrated design, the detector 960 is equivalent to the detector 124 in FIG. 1. An electrical link 970, e.g., a conductive path, is also formed on the substrate 901 to electrically couple the detector 960 to the modulator 920. The micro resonator 940 is used as a high-Q energy storage element to achieve low phase noise and micro size. A RF filter 126 may be disposed in the link 970 to ensure a single-mode oscillation. In absence of such a filter, a frequency filtering effect can be achieved by narrow band impedance matching between the modulator 920 and the detector 960.

Both waveguides 930 and 950 have coupling regions 932 and 952, respectively, to provide desired evanescent optical coupling at two different locations in the micro resonator 940. The first waveguide 930 has one end coupled to the modulator 920 to receive the modulated optical output and another end to provide an optical output of the OEO 900. The second waveguide 950 couples the optical energy from the micro resonator 940 and delivers the energy to the detector 960.

The complete closed opto-electronic loop is formed by the modulator 920, the first waveguide 930, the micro resonator 940, the second waveguide 950, the detector 960, and the electrical link 970. The phase delay in the closed loop is set so that the feedback signal from the detector 960 to the modulator 920 is positive. In addition, the total open loop gain exceeds the total losses to sustain an opto-electronic oscillation. The proper mode matching conditions between the resonator 940 and the total loop are also required. Since the laser carrier frequency should be at the transmission peak of the resonator 940 to sustain the oscillation, it may be desirable to dynamically adjust the cavity length of the micro resonator 940 to maintain this condition. This may be achieved by using a fraction of the optical output from the resonator 940 in a cavity control circuit to detect the deviation from this condition and to cause a mechanical squeeze on the resonator 940, e.g., through a piezo-electric transducer, to reduce the deviation.

In general, an electrical signal amplifier 125 may be connected between the detector 960 and the modulator 920. However, such a high-power element can be undesirable in a highly integrated on-chip design such as the OEO 900. For example, the high power of the amplifier may cause problems due to its high thermal dissipation. Also, the amplifier may introduce noise or distortion, and may even interfere with operations of other electronic components on the chip.

One distinctive feature of the OEO 900 is to eliminate such a signal amplifier in the link 970 by matching the impedance between the electro-absorption modulator 920 and the photodetector 960 at a high impedance value. The desired matched impedance is a value so that the photovoltage transmitted to the modulator 920, without amplification, is sufficiently high to properly drive the modulator 920. In certain systems, for example, this matched impedance may be about 1 kilo ohm or several kilo ohms. The electrical link 970 can be used, without a signal amplifier, to directly connect the photodetector 960 and the modulator 920 to preserve their high impedance. Such a direct electrical link 970 can ensure the maximum energy transfer between the two devices 920 and 960. For example, a pair of a detector and a modulator that are matched at 1000 ohm may have a voltage gain of 20 times that of the same pair that are matched at 50 ohm.

Figure 10:
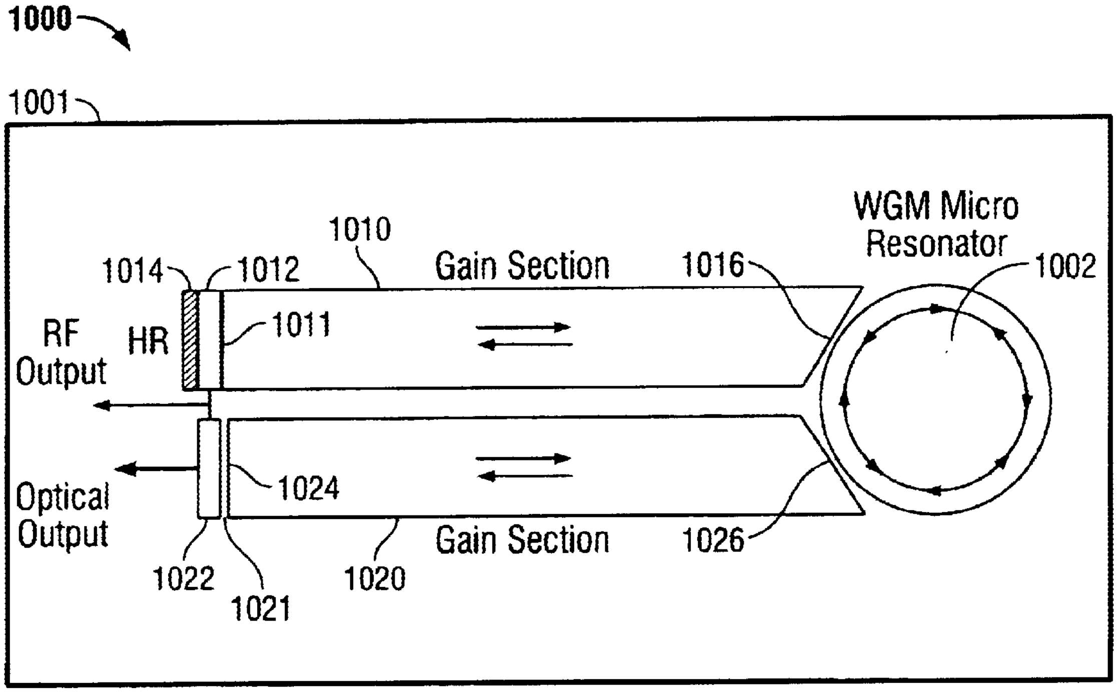

FIG. 10 shows another integrated coupled OEO 1000 suitable for implementing compact atomic clocks. This OEO is formed on a semiconductor substrate 1001 and includes two waveguides 1010 and 1020 that are coupled to a high Q micro WGM cavity 1002. The waveguides 1010 and 1020 have angled ends 1016 and 1026, respectively, to couple to the micro cavity 1002 by evanescent coupling. The other end of the waveguide 1010 includes an electrical insulator layer 1011, an electro-absorption modulator section 1012, and a high reflector 1014. This high reflector 1014 operates to induce pulse colliding in the modulator 1012 and thus enhance the mode-locking capability. The other end of the waveguide 1020 is a polished surface 1024 and is spaced from a photodetector 1022 by a gap 1021. The surface 1024 acts as a partial mirror to reflect a portion of light back into the waveguide 1020 and to transmit the remaining portion to the photodetector 1022 to produce an optical output and an electrical signal. An electrical link 1030 is coupled between the modulator 1012 and photodetector 1022 to produce an electrical output and to feed the signal and to feed the electrical signal to control the modulator 1012.

Notably, two coupled feedback loops are formed in the device 1000. An optical loop is in a Fabry-Perot resonator configuration, which is formed between the high reflector 1014 and the surface 1024 of the waveguide 1020 through the modulator 1012, the waveguide 1010, the micro cavity 1002, and the waveguide 1020. The gap 1021, the detector 1022, and the electrical link 1030 forms another opto-electronic loop that is coupled to the above optical loop.

In this implementation, the above optical loop forms a laser to replace the separate laser 101 in other OEOs described in this application. The waveguides 1010 and 1020 are optically active and doped within ions to also function as the gain medium so that the optical loop operates as a laser when activated by a driving current. This current can be injected from proper electrical contacts coupled to an electrical source. The gain of the laser is modulated electrically by the modulator 1012 in response to the electrical signal from the photodetector 1022. The two waveguides 1010 and 1020 may be positioned adjacent and parallel to each other on the substrate 1001 so that the photodetector 1022 and the modulator 1012 are close to each other. This arrangement facilitates wire bonding or other connection means between the photodetector 1022 and the modulator 1012.

The photodetector 1022 may be structurally identical to the electro-absorption modulator 1012 but is specially biased to operate as a photodetector. Hence, the photodetector 1022 and the modulator 1012 have a similar impedance, e.g., on the order of a few kilo ohms, and thus are essentially impedance matched. Taking typical values of 2 volts modulator switching voltage, 1 kilo ohm for the impedance of the modulator 1012 and photodetector 1022, the optical power required for the sustained RF oscillation is estimated at about 1.28 mW when the detector responsivity is 0.5 A/W. Such an optical power is easily attainable in semiconductor lasers. Therefore, under the impedance matching condition, a RF amplifier may be eliminated in the electrical link 1030 as in the integrated OEO 900 in FIG. 9.

Figure 11:
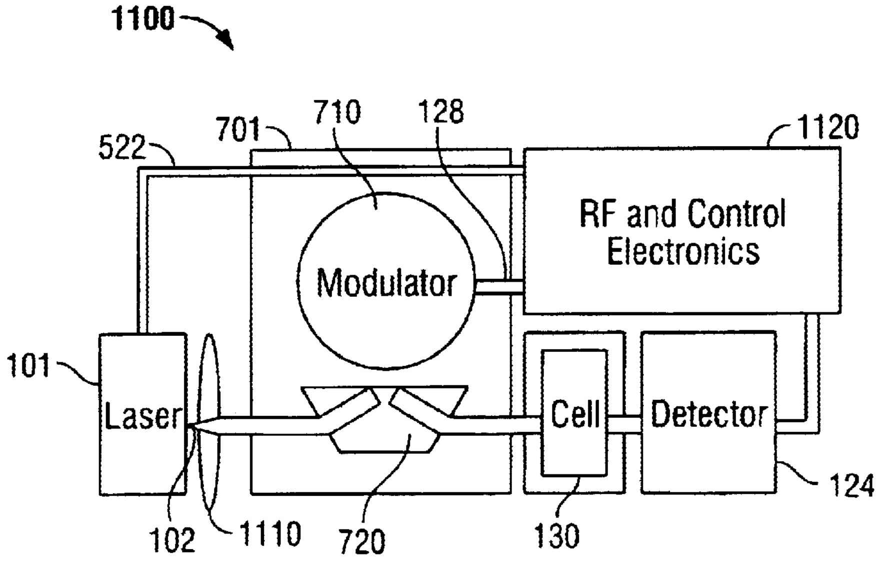

In the above compact WGM cavity devices, the atomic cell 130 may be inserted into the optical path to form a compact self-oscillating atomic clock as shown in FIGS. 4 and 6. As an example, FIG. 11 further shows an exemplary integrated self-oscillating atomic clock 1100 based on the design in FIG. 6. The WGM cavity modulator in FIG. 7 is used to perform both the optical modulation and the optical delay in the OEO loop. The laser beam 102 from the laser 101 is collimated by a lens 110 before being coupled into the WGM cavity 710. The circuit 1120 includes both the electrical section of the OEO loop and the laser frequency control circuit 520.

Alternatively, the atomic cell 130 may be used in a separate phase-lock loop for locking the OEO to the atomic frequency reference as illustrated in FIGS. 1 and 5.

The above examples for compact and integrated OEO-based atomic clocks illustrate different approaches to the device integration. One approach, for example, uses compact components to reduce the overall physical size of the OEO, such as using miniaturized devices for the optical delay element 120 or the optical modulator 110. The OEO devices in FIGS. 7, 8A, 8B, 9, 10, and 11 represent examples in this approach, where either a WGM micro resonator or an integrated semiconductor electro-absorption modulator is used to replace conventional bulky modulators. The WGM micro resonator is also used as to cause the desired optical delay in the OEO loop to avoid bulky optical delay elements.

Figure 12:
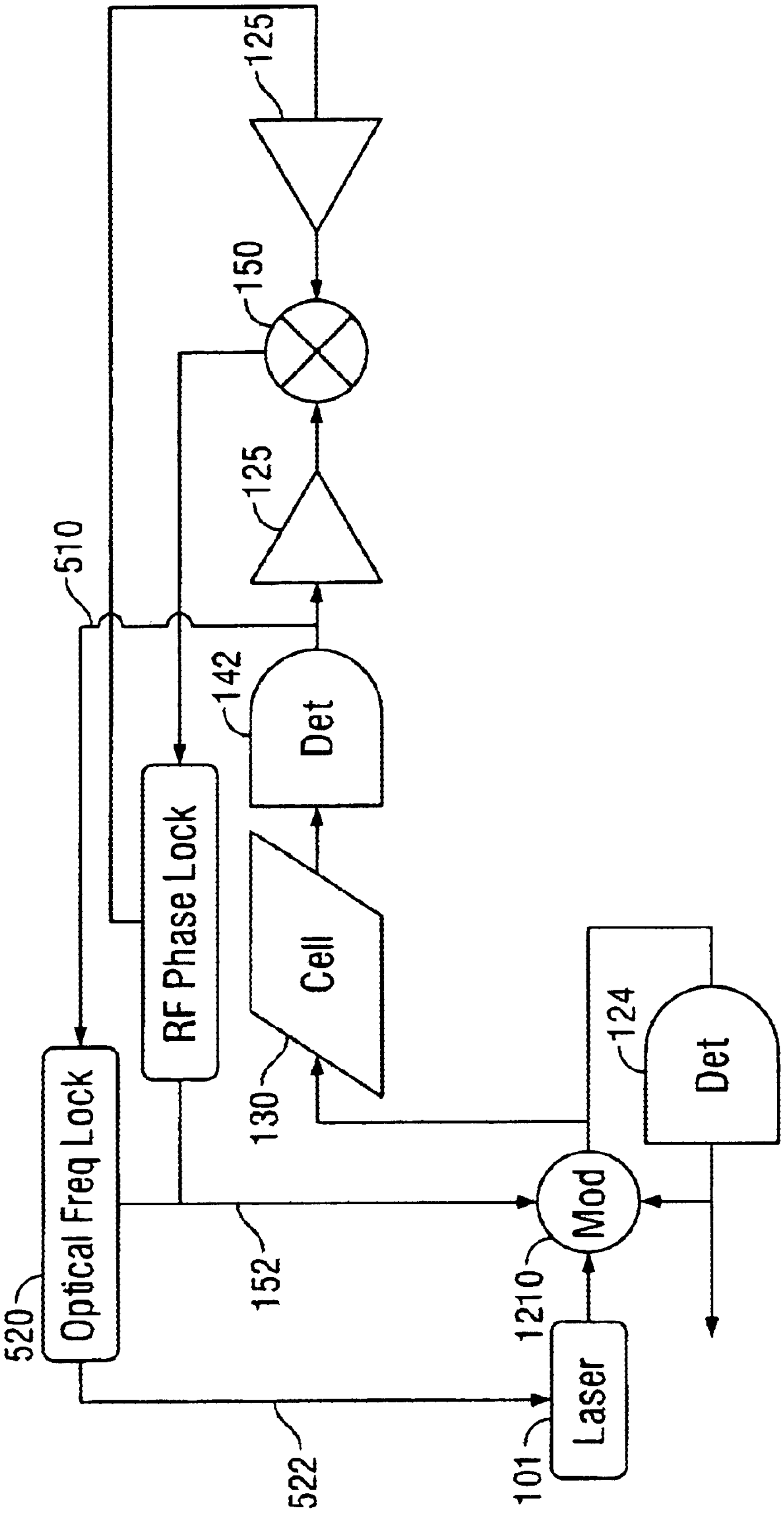

In another approach, the optical modulator 110 and the optical delay element 120 are integrated into a single unit within the OEO to miniaturize the whole device. FIGS. 7, 8A, 8B, and 11 represent examples in this approach. In FIG. 8A, the modulated optical output 114 may be directly fed into the optical detector 124 in the OEO loop without going through another optical delay element due to the high Q value of the resonator 810. FIG. 12 further shows an OEO-based atomic clock under this approach. Notably, a special optical modulator 1210 is used to provide both optical modulation and the optical delay. The OEO loop is formed by the modulator 1210 and the detector 124. This modulator 1210 may be implemented by, e.g., the WGM resonator modulator in FIGS. 7, 8A, 8B, and 11. An optional laser frequency feedback loop for stabilizing the laser 101 is also shown in FIG. 12. The signal mixer 150 is shown to receive one input from the detector 142 and another input from the phase-lock loop coupled between the modulator 1210 and the mixer 150. As shown in other examples, the second input to the mixer 150 may be taken from the output of the detector 124 in the OEO loop. In addition, the output from the optical frequency lock circuit 420 may be combined with the signal 152 to control the modulator 1210.

FIG. 10 also suggests yet another approach to the integration of the OEO-based atomic clocks where the laser source that powers the OEO and the optical modulator may be integrated as a single unit. In the OEO 1000 in FIG. 10, the electro-absorption modulator 1012 is within the laser resonator formed by the reflectors 1014 and 1024. Hence, there is no need for a separate optical modulator. This combination of the laser and the optical modulator may be implemented in a modulated laser such as a diode laser or a diode-based laser where the driving current of the laser may be directly modulated to change the internal gain of the laser and thus produce a modulated optical output.

Figure 13A:
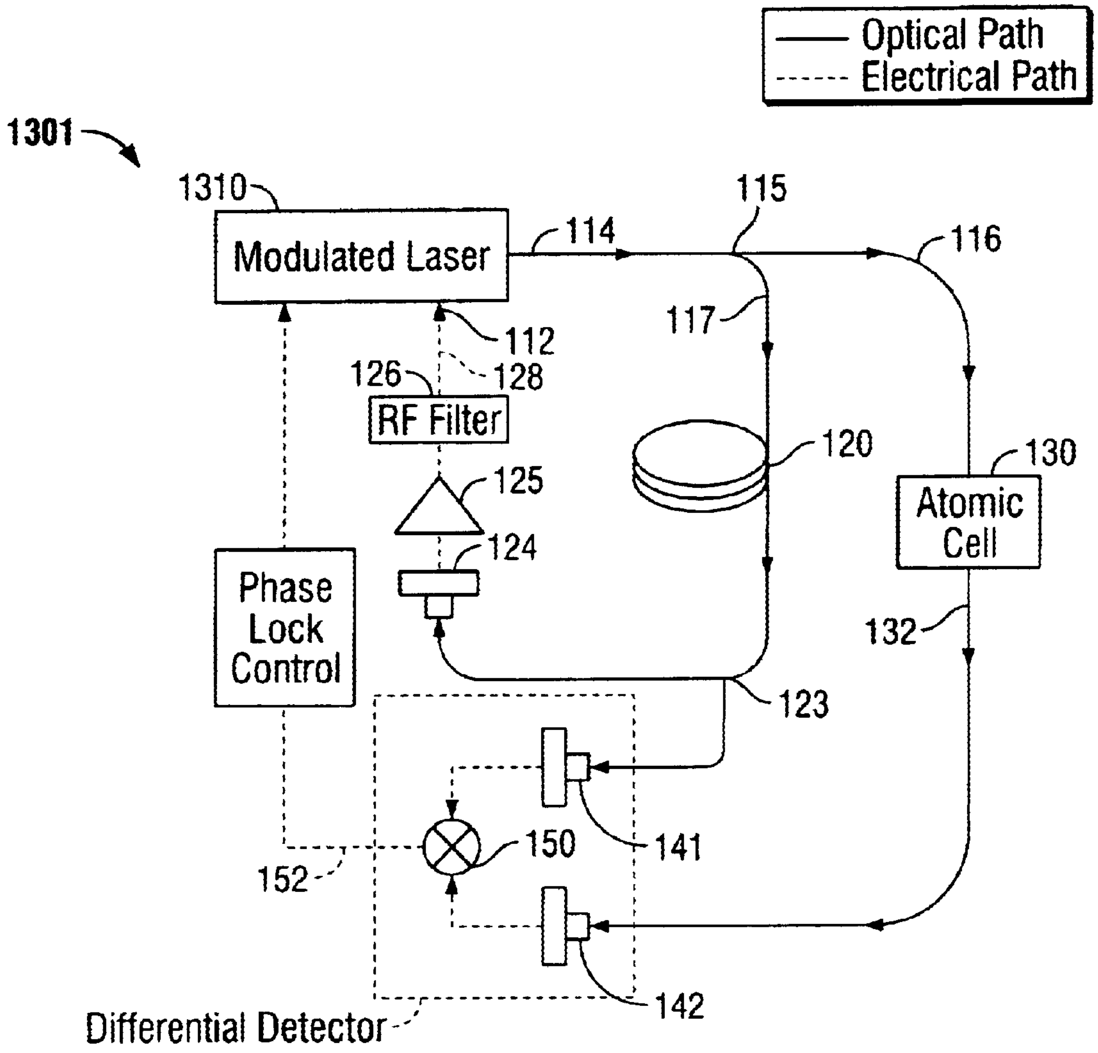
Figure 13B:
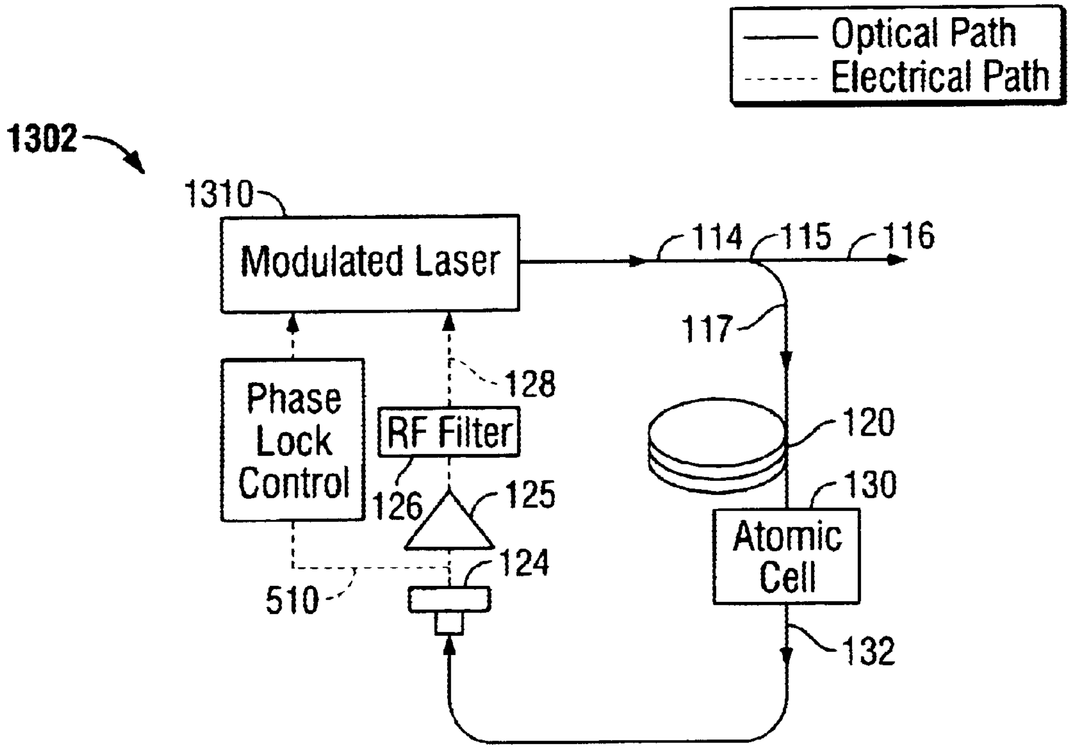

FIGS. 13A and 13B show two exemplary OEO-based atomic clocks where a single directly modulated laser 1310 is used to both produce the laser carrier and provide the modulation of the laser carrier. OEO 1301 in FIG. 13A has an external frequency lock loop with an atomic cell. OEO 1302 in FIG. 13B is a self-oscillating OEO. The laser 1310 in both devices 1301 and 1302 is a tunable laser and can be directly modulated. The optical delay element 120 may be implemented with a WGM microcavity. In FIG. 13A, two separate feedback loops are used: one is the OEO loop with the optical delay element 120 and another is the phase-lock loop for locking the modulation frequency of the modulated laser output 114 to a desired atomic frequency reference in the atomic cell 130. The phase-lock control and the OEO loop feedback signal 128 may be combined to control the modulation of the laser 101. In addition, another phase-look loop may be used to stabilize the laser carrier frequency of the laser 1310. In FIG. 13B, the atomic cell 130 is in the optical section of the OEO loop so that the feedback signal 128 in the OEO loop allows the OEO to be locked to the atomic frequency reference provided by the atomic cell 130 if the carrier frequency of the laser 1310 is stabilized. The additional phase-lock loop based on a signal 510 split from the output of the detector 124 may be used to stabilize the laser carrier frequency of the laser 1310 by, e.g., controlling the cavity length of the laser.

Certainly, other integration configurations based on combinations or variations of the above approaches may be possible. In summary, only a few implementations of the OEO-based atomic clocks are disclosed. However, it is understood that variations and enhancements may be made.

What is claimed is:

1. A device, comprising:

an opto-electronic oscillator having an opto-electronic loop with an optical section and an electrical section, said oscillator operable to generate an oscillation at an oscillation frequency; and an atomic reference module including an atomic frequency reference and coupled to receive and interact with at least a portion of an optical signal in said optical section to produce a feedback signal, wherein said oscillator is operable to respond to said feedback signal to stabilize said oscillation frequency with respect to said atomic frequency reference.

2. The device as in claim 1, wherein said oscillator includes an optical modulator to receive a laser carrier at a carrier frequency and to modulate said laser carrier at a modulation frequency to produce a modulated optical signal in response to an electrical output of said electrical section, wherein said optical section receives at least a portion of said modulated optical signal.

3. The device as in claim 2, wherein said optical section includes an optical delay element to produce a delay in said opto-electronic loop.

4. The device as in claim 3, wherein said optical delay element includes an optical resonator.

5. The device as in claim 4, wherein said optical resonator is a whispering gallery mode resonator.

6. The device as in claim 2, wherein said atomic reference module includes an atomic cell located in said optical section to filter optical energy.

7. The device as in claim 2, wherein said atomic reference module comprises a feedback loop having an atomic cell to provide said atomic frequency reference and to transmit said portion of said optical signal, an optical detector to convert optical transmission of said atomic cell into a monitor signal, and a feedback unit to produce said feedback signal by processing said monitor signal and to use said feedback to control said optical modulator.

8. The device as in claim 2, wherein said optical modulator includes an optical resonator within which said laser carrier is modulated, said optical resonator operable to produce an optical delay in said opto-electronic loop.

9. The device as in claim 8, wherein said optical resonator is a whispering gallery mode resonator.

10. The device as in claim 9, wherein said whispering gallery mode resonator is formed an electro-optical material.

11. The device as in claim 2, wherein said optical modulator is a phase modulator.

12. The device as in claim 2, wherein said optical modulator is an amplitude modulator.

13. The device as in claim 1, wherein said oscillator includes a laser coupled to receive an electrical signal from said electrical section and operable to modulate a laser gain at a modulation frequency in response to said electrical signal to produce a modulated optical signal having modulation bands in a laser carrier at a laser frequency, wherein said optical section receives at least a portion of said modulated optical signal.

14. The device as in claim 13, wherein said atomic reference module includes an atomic cell located in said optical section to filter optical energy.

15. The device as in claim 13, wherein said atomic reference module comprises a feedback loop having an atomic cell to provide said atomic frequency reference and to transmit said portion of said optical signal, an optical detector to convert optical transmission of said atomic cell into a monitor signal, and a feedback unit to produce said feedback signal by processing said monitor signal, said feedback unit operable to control said laser with said feedback signal to stabilize said oscillation frequency.

16. The device as in claim 1, wherein said atomic reference module comprises an atomic cell having atoms with an energy structure comprising three different energy levels that allow for two different optical transitions that share a common energy level, wherein one modulation band and another immediate adjacent band in said modulated optical signal are in resonance with said two different optical transitions, respectively.

17. The device as in claim 16, wherein said atomic cell includes a solid-state material to form a matrix which hold said atoms.

18. A device, comprising:

an optical modulator to modulate an optical carrier signal at a modulation frequency in response to an electrical modulation signal to produce a plurality of modulation bands in said optical carrier signal;

an opto-electronic loop having an optical section coupled to receive a first portion of said optical carrier signal from said optical modulator, and an electrical section to produce said electrical modulation signal according to said first portion of said optical carrier signal, said opto-electronic loop causing a delay in said electrical modulation signal to provide a positive feedback to said optical modulator;

a frequency reference module having an atomic transition in resonance with a selected modulation band among said modulation bands and coupled to receive a second portion of said optical carrier signal, said second portion interacting with said atomic transition to generate an optical monitor signal; and a feedback module to receive said optical monitor signal and to control said optical modulator in response to information in said optical monitor signal to lock said modulation frequency relative to an atomic reference frequency associated with said atomic transition.

19. The device as in claim 18, wherein said optical section includes an optical resonator.

20. The device as n claim 19, wherein said optical resonator has a structure to support at least one whispering gallery mode.

21. The device as in claim 18, wherein said optical section includes a fiber segment.

22. The device as in claim 18, wherein said opto-electronic loop includes an optical detector coupled between said optical and said electrical sections to convert said second portion into an electrical signal as an input to said electrical section.

23. The device as in claim 18, wherein said frequency reference module includes a second, different atomic transition that shares a common energy level with said atomic transition, and wherein said second atomic transition is in resonance with a spectral component in said optical carrier signal.

24. The device as in claim 18, wherein said spectral component is separated from said selected modulation band in frequency by said modulation frequency.

25. The device as in claim 18, wherein said feedback module comprises:

an optical splitter to couple a portion of optical energy in said optical section as a reference optical signal; and a differential detector to convert said reference optical signal and said optical monitor signal into two detector signals and to produce a differential signal which controls said optical modulator to lock said modulation frequency.

26. The device as in claim 25, wherein said feedback module operates to use said differential signal to control a DC bias in said optical modulator.

27. A device, comprising:

an opto-electronic oscillator to receive an optical signal at an optical carrier frequency and to output a modulated optical signal having a carrier band at said optical carrier frequency and a plurality of modulation bands;

an atomic filter to receive and filter at least a portion of said modulated optical signal to produce an optical monitor signal, said atomic filter having atoms with an energy structure comprising three different energy levels that allow for two different optical transitions that share a common energy level, wherein one modulation band and another immediate adjacent band in said modulated optical signal are in resonance with said two different optical transitions, respectively; and a feedback control coupled to receive said optical monitor signal and to control said opto-electronic oscillator to lock a frequency of each modulation band relative to an atomic frequency reference in said three different energy levels according to information in said optical monitor signal indicative of a variation in said frequency relative to said atomic frequency reference.

28. The device as in claim 27, wherein said opto-electronic oscillator comprises:

an optical resonator to support whispering gallery modes and formed of an electro-optic material;

an electrical control coupled to said optical resonator to apply a control electrical field to modulate a property of said electro-optic material;

an optical coupler positioned to couple said optical signal into said optical resonator in one whispering gallery mode and couple energy in said one whispering gallery mode out to produce said modulated optical signal;

an optical loop to receive said modulated optical signal; and a photodetector coupled to said optical loop to convert optical energy in said optical loop into a detector signal, said photodetector coupled to send said detector signal to said electrical control.

29. The device as in claim 28, wherein said feedback control comprises an optical detector to convert said optical monitor signal into a bias control signal and to apply said bias control signal to control a DC bias in said control electrical field at said optical resonator.

30. The device as in claim 27, wherein said opto-electronic oscillator comprises:

a semiconductor electro-absorption modulator to modulate said optical signal in response to an electrical control signal;

a first optical waveguide to receive said modulated optical signal from said semiconductor electro-absorption modulator;

a whispering gallery mode resonator optically coupled to receive at least part of said modulated optical signal;

a second optical waveguide optically coupled to to receive an output optical signal from said whispering gallery mode resonator;

a photodetector to convert said output optical signal into an electrical signal; and an electrical unit connected between said photodetector and said semiconductor electro-absorption modulator to apply a portion of said electrical signal as said electrical control signal.

31. A method, comprising:

modulating a coherent laser beam at a modulation frequency to produce a modulated optical beam;

transmitting a portion of the modulated optical beam through an optical delay element to cause a delay;

converting the portion from the optical delay element into an electrical signal;

using the electrical signal to control modulation of the coherent laser beam to cause an oscillation at the modulation frequency;

obtaining a deviation of the modulation frequency from an atomic frequency reference; and adjusting the modulation of the coherent laser beam to reduce the deviation.

32. The method as in claim 31, further comprising:

using a tunable laser to produce the coherent laser beam; and adjusting the frequency of the tunable laser in response to the deviation to stabilize the tunable laser.

33. A device, comprising:

an optical modulator to modulate an optical carrier signal at a modulation frequency in response to an electrical modulation signal to produce a plurality of modulation bands in said optical carrier signal; and an opto-electronic loop having an optical section coupled to receive a portion of said optical carrier signal from said optical modulator, and an electrical section to produce said electrical modulation signal from said portion of said optical carrier signal, said opto-electronic loop causing a delay in said electrical modulation signal to provide a positive feedback to said optical modulator; and an atomic cell having atoms with two atomic transitions sharing a common energy level and in resonance with two adjacent bands in said modulated optical signal to exhibit electromagnetically induced transparency, said atomic cell positioned in said optical section to transmit said first portion of said optical carrier signal to said electrical section.

34. The device as in claim 33, further comprising:

a laser to produce said optical carrier signal at a carrier frequency; and a laser frequency control coupled to receive and process a portion of said electrical modulation signal indicative of a variation of said carrier frequency and operable to control said laser to reduce said variation.

35. The device as in claim 33, wherein said optical modulator includes a whispering gallery mode resonator formed of an electro-optical material and having electrodes to receive said positive feedback.

36. The device as in claim 33, wherein said optical modulator includes a semiconductor electro-absorption modulator and said optical section of said opto-electronic loop includes a whispering gallery mode resonator.

37. A device, comprising:

an optical resonator configured to support whispering gallery modes and formed of an electro-optical material;

an optical coupler near said optical resonator to evanescently couple an input optical signal into a whispering gallery mode in said optical resonator and to couple energy in said whispering gallery mode out of said optical resonator to produce an optical output signal;

electrodes formed on said optical resonator to apply an electrical control signal to said optical resonator to change a refractive index of said electro-optical material to modulate said optical output signal at a modulation frequency;

an atomic cell having atoms that interact with said modulated optical output signal to exhibit electromagnetically induced transparency, said atomic cell located to receive at least a portion of said modulated optical output signal to produce an optical transmission;

a photodetector to convert said optical transmission into a detector signal; and a feedback control to produce said electrical control signal according to said detector signal to stabilize said modulation frequency relative to an atomic frequency reference in said atoms.

38. A device, comprising:

a substrate;

a semiconductor optical modulator formed on said substrate to modulate light in response to an electrical modulation signal;

a first waveguide on said substrate coupled to receive a modulated optical signal from said optical modulator;

an optical resonator to support whispering gallery modes and optically coupled to said first waveguide via evanescent coupling;

a second waveguide on said substrate having a first end optically coupled to said optical resonator via evanescent coupling and a second end;

a photodetector on said substrate to receive and convert an optical output from said second waveguide into an electrical signal;

an electrical link coupled between said photodetector and said optical modulator to produce said electrical modulation signal from said electrical signal;

a reflector located on one side of said semiconductor optical modulator to form an optical cavity with said second end of said second waveguide to include said semiconductor optical modulator, said optical resonator, said first and said second waveguides in an optical path within said optical cavity, wherein said first and second waveguides are doped to produce an optical gain for a laser oscillation in said optical cavity; and an atomic cell on said substrate having atoms that interact with light in said optical cavity to exhibit electromagnetically induced transparency, said atomic cell located to receive at least a portion of said light to produce an optical transmission;

a second photodetector on said substrate to convert said optical transmission into a detector signal; and a feedback control to control said optical modulator according to said detector signal to stabilize a modulation frequency in said light relative to an atomic frequency reference in said atoms.

* * * * *